(12) United States Patent
Lin et al.

(10) Patent No.: US 11,128,847 B2
(45) Date of Patent: Sep. 21, 2021

(54) INFORMATION DISPLAY DEVICE AND INFORMATION DISPLAY METHOD

(71) Applicant: Huawei Technologies Co., Ltd., Shenzhen (CN)

(72) Inventors: Tao Lin, Shenzhen (CN); Pengcheng Zhou, Shanghai (CN); Yan Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 16/551,250

(22) Filed: Aug. 26, 2019

(65) Prior Publication Data

US 2019/0379868 A1 Dec. 12, 2019

Related U.S. Application Data

(63) Continuation of application No. PCT/CN2018/075630, filed on Feb. 7, 2018.

(30) Foreign Application Priority Data

Feb. 28, 2017 (CN) .......................... 201710114900.2

(51) Int. Cl.
*H04N 9/31* (2006.01)
*G02B 6/02* (2006.01)
*G02B 27/01* (2006.01)

(52) U.S. Cl.
CPC ....... *H04N 9/3173* (2013.01); *G02B 6/02085* (2013.01); *G02B 27/0103* (2013.01);
(Continued)

(58) Field of Classification Search
None
See application file for complete search history.

(56) References Cited

U.S. PATENT DOCUMENTS

| 2006/0291021 A1 | 12/2006 | Mukawa |
| 2010/0157433 A1 | 6/2010 | Mukawa et al. |

(Continued)

FOREIGN PATENT DOCUMENTS

| CN | 1892271 A | 1/2007 |
| CN | 101750738 A | 6/2010 |

(Continued)

OTHER PUBLICATIONS

Foreign Communication From a Counterpart Application, European Application No. 18761329.4, Extended European Search Report dated Jan. 16, 2020, 5 pages.

(Continued)

*Primary Examiner* — Jennifer D. Carruth
(74) *Attorney, Agent, or Firm* — Conley Rose, P.C.

(57) ABSTRACT

An information display device includes a spatial light modulator, configured to emit a holographic three-dimensional light field to a first grating, where the holographic three-dimensional light field corresponds to at least two focal planes, the first grating, configured to deflect the holographic three-dimensional light field emitted by the spatial light modulator, so that the holographic three-dimensional light field is propagated along a first direction and transmitted into an optical waveguide, the optical waveguide, configured to receive the holographic three-dimensional light field transmitted from the first grating, and propagate the holographic three-dimensional light field in the optical waveguide, and a second grating, configured to deflect the holographic three-dimensional light field that is propagated in the optical waveguide.

20 Claims, 4 Drawing Sheets

(52) U.S. Cl.
CPC ....... *G02B 27/0172* (2013.01); *H04N 9/3102* (2013.01); *G02B 2027/0134* (2013.01); *G02B 2027/0174* (2013.01)

(56) References Cited

U.S. PATENT DOCUMENTS

| | | | |
|---|---|---|---|
| 2012/0002256 | A1 | 1/2012 | Lacoste et al. |
| 2012/0218481 | A1* | 8/2012 | Popovich ............ G02F 1/13342 349/11 |
| 2014/0160543 | A1 | 6/2014 | Putilin et al. |
| 2014/0168735 | A1 | 6/2014 | Yuan et al. |
| 2015/0205138 | A1 | 7/2015 | Dobschal et al. |
| 2016/0313556 | A1 | 10/2016 | Futterer |
| 2018/0120563 | A1* | 5/2018 | Kollin ................. G03H 1/2249 |
| 2019/0155033 | A1* | 5/2019 | Gelman ............. G02B 27/0172 |

FOREIGN PATENT DOCUMENTS

| | | | |
|---|---|---|---|
| CN | 104007552 | A | 8/2014 |
| CN | 104090372 | A | 10/2014 |
| CN | 104520751 | A | 4/2015 |
| CN | 104570353 | A | 4/2015 |
| CN | 104614857 | A | 5/2015 |
| CN | 105159045 | A | 12/2015 |
| CN | 105487170 | A | 4/2016 |
| CN | 105549150 | A | 5/2016 |
| CN | 106338832 | A | 1/2017 |
| CN | 106371218 | A | 2/2017 |
| CN | 106371222 | A | 2/2017 |
| CN | 106526730 | A | 3/2017 |
| CN | 106707518 | A | 5/2017 |
| WO | 2016010289 | A1 | 1/2016 |
| WO | 2016113533 | A2 | 7/2016 |

OTHER PUBLICATIONS

Pengcheng, Z., et al, "Multi-plane holographic display and its noise elimination," Journal of Applied Optics, vol. 35 No. 6, Nov. 2014, 7 pages. With an English Abstract.

Machine Translation and Abstract of Chinese Publication No. CN104007552, Aug. 27, 2014, 19 pages.
Machine Translation and Abstract of Chinese Publication No. CN104090372, Oct. 8, 2014, 12 pages.
Machine Translation and Abstract of Chinese Publication No. CN104570353, Apr. 29, 2015, 15 pages.
Machine Translation and Abstract of Chinese Publication No. CN104614857, May 13, 2015, 9 pages.
Machine Translation and Abstract of Chinese Publication No. CN105159045, Dec. 16, 2015, 6 pages.
Machine Translation and Abstract of Chinese Publication No. CN105549150, May 4, 2016, 9 pages.
Machine Translation and Abstract of Chinese Publication No. CN106338832, Jan. 18, 2017, 16 pages.
Machine Translation and Abstract of Chinese Publication No. CN106371218, Feb. 1, 2017, 49 pages.
Machine Translation and Abstract of Chinese Publication No. CN106371222, Feb. 1, 2017, 19 pages.
Machine Translation and Abstract of Chinese Publication No. CN106526730, Mar. 22, 2017, 37 pages.
Machine Translation and Abstract of Chinese Publication No. CN106707518, May 24, 2017, 13 pages.
Machine Translation and Abstract of International Publication No. WO2016010289, Jan. 21, 2016, 38 pages.
Foreign Communication From a Counterpart Application, Chinese Application No. 201710114900.2, Chinese Office Action dated Aug. 3, 2018, 8 pages.
Foreign Communication From a Counterpart Application, Chinese Application No. 201710114900.2, Chinese Office Action dated Mar. 22, 2019, 9 pages.
Foreign Communication From a Counterpart Application, PCT Application No. PCT/CN2018/075630, English Translation of International Search Report dated May 8, 2018, 4 pages.
Foreign Communication From a Counterpart Application, PCT Application No. PCT/CN2018/075630, English Translation of Written Opinion dated May 8, 2018, 7 pages.

* cited by examiner

INFORMATION DISPLAY DEVICE AND INFORMATION DISPLAY METHOD

CROSS-REFERENCE TO RELATED APPLICATIONS

This application is a continuation of International Application No. PCT/CN2018/075630, filed on Feb. 7, 2018, which claims priority to Chinese Patent Application No. 201710114900.2, filed on Feb. 28, 2017. The disclosures of the aforementioned applications are hereby incorporated by reference in their entireties.

TECHNICAL FIELD

Embodiments of this application relate to the field of information display technologies, and in particular, to an information display device and an information display method.

BACKGROUND

An augmented reality (AR) technology is a technology that seamlessly integrates real-world information and virtual-world information, where the virtual-world information is applied to a real world using science and technologies such as sensing, computing, and graphics.

Currently, diversified AR glasses products emerge in the market. A common characteristic of these products is that a virtual image is mapped onto a fixed focal plane, so that a user can see the image on the focal plane, and different images are displayed for a left eye and a right eye using disparity, thereby generating a three-dimensional display effect.

A common solution applied to an AR display device is a diffraction grating-based optical waveguide solution. In brief, a working principle of the solution is as follows: Light from an image source becomes parallel light after passing through a collimation lens. When illuminated to a diffraction grating at a coupling entrance, the parallel light is diffracted. The diffracted light enters an optical waveguide, and is transmitted in the optical waveguide in a total reflection manner and diffracted out by a diffraction grating at a coupling exit, where the light diffracted out is parallel light. The parallel light enters human eyes. For the human eyes, the parallel light is equivalent to a light ray emitted by a light source from infinity. Therefore, for such products, a focal plane is usually arranged at infinity in an optical sense.

However, on a conventional AR display device, to clearly see a virtual object, a user needs to focus eyes on a fixed focal plane. Because lenses of the eyes are fixed for a long time, harm to vision is caused if the conventional AR display device is used for a long time. In addition, when a rendered virtual object moves in space, the user's sight converges on the virtual object but the human eyes focus on the fixed focal plane. Consequently, sight convergence information is inconsistent with eyeball focusing information, which is also known as a "vergence-accommodation conflict" problem, and discomfort is brought to the human eyes if the conventional AR display device is used for a long time. Furthermore, the focal plane is arranged at infinity in an optical sense. In other words, a focusing position of the human eyes is at infinity in an optical sense. When the rendered virtual object needs to be superimposed on a real object relatively close to the human eyes, the human eyes need to focus on the nearby real object and then cannot simultaneously focus on the focal plane at infinity in an optical sense. As a result, the user cannot clearly see both the real object and the virtual object that is superimposed on the real object.

SUMMARY

Embodiments of this application provide an information display device and an information display method, to resolve a problem that a focal plane is unique and fixed when an information display device displays a three-dimensional image.

The specific technical solutions provided in the embodiments of this application are as follows.

According to a first aspect, an information display device is provided. A holographic three-dimensional image is generated using a spatial light modulator. The holographic three-dimensional image enters an optical waveguide through grating coupling, is propagated in the optical waveguide and then emitted out through grating coupling, and enters human eyes, so that the human eyes can see an image of true three-dimensional display. The image of true three-dimensional display is an image that is displayed in three dimensions and that can correctly display binocular disparity and focusing information at the same time.

In a possible design, the information display device includes a spatial light modulator, a first grating, a second grating, and an optical waveguide. The spatial light modulator is configured to emit a holographic three-dimensional light field to the first grating, where the holographic three-dimensional light field corresponds to at least two focal planes. The first grating is configured to deflect the holographic three-dimensional light field emitted by the spatial light modulator, so that the holographic three-dimensional light field is propagated along a first direction and transmitted into the optical waveguide. The optical waveguide is configured to receive the holographic three-dimensional light field transmitted from the first grating, propagate the holographic three-dimensional light field in the optical waveguide, and propagate the holographic three-dimensional light field to the second grating. The second grating is configured to deflect the holographic three-dimensional light field that is propagated in the optical waveguide, so that the holographic three-dimensional light field is emitted out from the optical waveguide along a second direction, and a user sees a holographic three-dimensional image corresponding to the holographic three-dimensional light field after the user's eyes receive the holographic three-dimensional light field that is emitted out along the second direction. This avoids a problem of a conventional information display device that a sight convergence point of human eyes is different from a focusing point of eyeballs because a focal plane is fixed, so that the human eyes can see true three-dimensional display and the human eyes can simultaneously receive a real-scene image and a holographic three-dimensional image, thereby generating an augmented reality effect with a true three-dimensional display function.

In a possible design, the information display device further includes a separation hole, where the separation hole is arranged in the second grating, and the first grating further has a lens function and is further configured to focus the holographic three-dimensional light field. The first grating is configured to focus, at the separation hole, zero-order light in the holographic three-dimensional light field. The separation hole is configured to absorb the focused zero-order light, or propagate the focused zero-order light along a third direction, where the third direction is different from the second direction. In this way, interference of the zero-order light to a display effect of the holographic three-dimensional image can be canceled, so that an ultimately displayed holographic three-dimensional image is clearer and with higher contrast and a better display effect.

In a possible design, the second grating further has a lens function and is further configured to, when the holographic three-dimensional image is located within a 1× focal length of the second lens, magnify the holographic three-dimensional image for display. In this way, a display field of view can be magnified.

In a possible design, the first grating is disposed between the spatial light modulator and the optical waveguide, and the first grating enables the holographic three-dimensional light field to penetrate the first grating, and deflects the holographic three-dimensional light field, or the optical waveguide is disposed between the first grating and the spatial light modulator, and the first grating reflects the holographic three-dimensional light field, and the second grating is disposed between the spatial light modulator and the optical waveguide, and the second grating enables the holographic three-dimensional light field to penetrate the second grating, and deflects the holographic three-dimensional light field, or the optical waveguide is disposed between the spatial light modulator and the second grating, and the second grating reflects the holographic three-dimensional light field. In this way, a structure type of the information display device is extended, so that a structure design of the information display device is more flexible and convenient.

In a possible design, the second grating has high transparency, so that the human eyes can simultaneously receive a real-scene image and a holographic three-dimensional image, thereby generating an augmented reality effect with a true three-dimensional display function.

According to a second aspect, an information display method is provided. A holographic three-dimensional light field is emitted to a first grating using a spatial light modulator, where the holographic three-dimensional light field corresponds to at least two focal planes, the holographic three-dimensional light field emitted by the spatial light modulator is deflected using the first grating, so that the holographic three-dimensional light field is propagated along a first direction and transmitted into the optical waveguide, the holographic three-dimensional light field transmitted from the first grating is received by the optical waveguide, the holographic three-dimensional light field is propagated in the optical waveguide, and the holographic three-dimensional light field is propagated to the second grating, and the holographic three-dimensional light field that is propagated in the optical waveguide is deflected using the second grating, so that the holographic three-dimensional light field is emitted out from the optical waveguide along a second direction, and a user sees a holographic three-dimensional image corresponding to the holographic three-dimensional light field after the user's eyes receive the holographic three-dimensional light field that is emitted out along the second direction. This avoids a problem of a conventional information display device that a sight convergence point of human eyes is different from a focusing point of eyeballs because a focal plane is fixed, so that the human eyes can see true three-dimensional display and the human eyes can simultaneously receive a real-scene image and a holographic three-dimensional image, thereby generating an augmented reality effect with a true three-dimensional display function.

In a possible design, zero-order light in the holographic three-dimensional light field is focused at a separation hole using the first grating, where the separation hole is arranged in the second grating, and the focused zero-order light is absorbed using the separation hole, or the focused zero-order light is propagated using the separation hole along a third direction, where the third direction is different from the second direction. In this way, interference of the zero-order light to a display effect of the holographic three-dimensional image can be canceled, so that an ultimately displayed holographic three-dimensional image is clearer and with higher contrast and a better display effect.

In a possible design, when the holographic three-dimensional image is located within a 1× focal length of the second grating, the holographic three-dimensional image is magnified for display using the second grating, where the second grating has a lens function. In this way, a display field of view can be magnified.

In a possible design, if the first grating is disposed between the spatial light modulator and the optical waveguide, the first grating enables the holographic three-dimensional light field to penetrate the first grating, and deflects the holographic three-dimensional light field, if the optical waveguide is disposed between the first grating and the spatial light modulator, the holographic three-dimensional light field emitted by the spatial light modulator is reflected using the first grating, if the second grating is disposed between the spatial light modulator and the optical waveguide, the second grating enables the holographic three-dimensional light field to penetrate the second grating, and deflects the holographic three-dimensional light field, or if the optical waveguide is disposed between the spatial light modulator and the second grating, the holographic three-dimensional light field is reflected using the second grating. In this way, a structure type of the information display device is extended, so that a structure design of the information display device is more flexible and convenient.

According to a third aspect, a head-mounted augmented reality device is provided, including the information display device according to any one of the first aspect or the possible designs of the first aspect.

DESCRIPTION OF EMBODIMENTS

The following describes in detail the embodiments of this application with reference to the accompanying drawings.

An embodiment of this application provides a holographic optical element-based information display device. A holographic three-dimensional image is generated using a spatial light modulator. The holographic three-dimensional image enters an optical waveguide through grating coupling, is propagated in the optical waveguide and then emitted out through grating coupling, and enters human eyes, so that the human eyes can see an image of true three-dimensional display. The image of true three-dimensional display is an image that is displayed in three dimensions and that can correctly display binocular disparity and focusing information at the same time. This avoids a problem of a conventional information display device that a sight convergence point of human eyes is different from a focusing point of eyeballs because a focal plane is fixed, so that the human eyes can see true three-dimensional display and the human eyes can simultaneously receive a real-scene image and a holographic three-dimensional image, thereby generating an augmented reality effect with a true three-dimensional display function.

Figure 1:
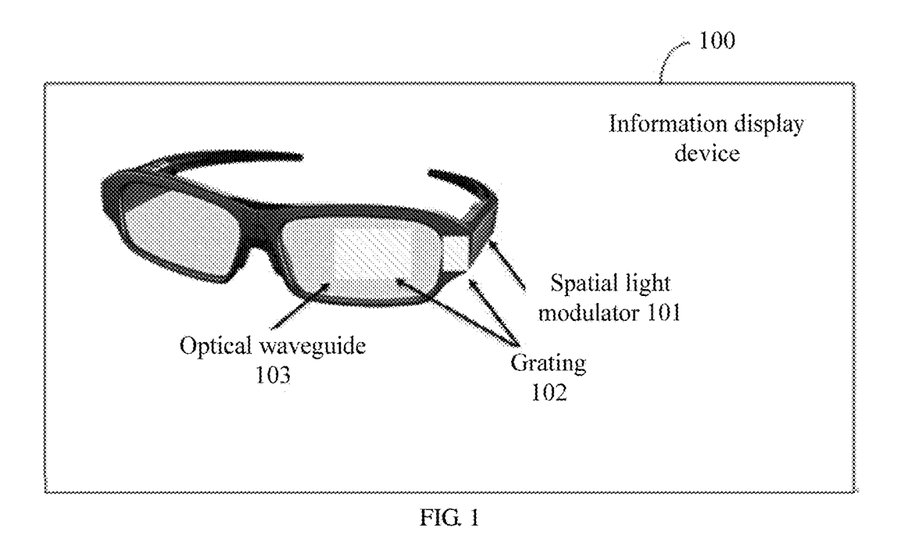
FIG. 1 is a schematic architectural diagram of an information display device according to an embodiment of this application.

The information display device in this embodiment of this application may be a pair of AR glasses. FIG. 1 is a possible architectural diagram. An information display device 100 includes a spatial light modulator 101, a first grating 102, a second grating 102, and an optical waveguide 103.

The spatial light modulator 101 may be, for example, liquid crystal on silicon (LCoS), which is also referred to as silicon-based liquid crystal or monocrystalline silicon reflective liquid crystal, or may be, for another example, a microelectromechanical system (MEMS), or may be a display device such as a liquid crystal display.

A grating 102 (including the first grating 102 and the second grating 102) may be a coupling grating, for example, a holographic film. The grating 102 can deflect a propagation direction of a light ray. The light ray can penetrate the grating 102. The grating 102 can also reflect the light ray. The first grating 102 and the second grating 102 have same materials and functions, and an only difference lies in that the first grating 102 and the second grating 102 have different locations in the information display device, so that the first grating 102 and the second grating 102 deflect the light ray at different locations for different functions.

Figure 2:
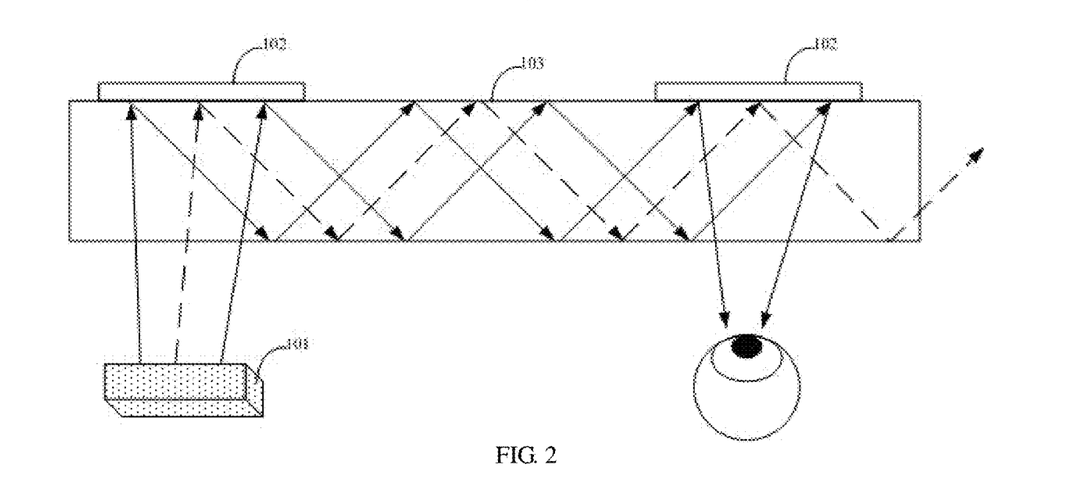
FIG. 2 is a schematic structural diagram 1 of an information display device according to an embodiment of this application.

From the perspective of structures, as shown in FIG. 2, the information display device 100 may include the following several structures.

The optical waveguide 103 is disposed between the spatial light modulator 101 and the first grating 102, and the optical waveguide 103 is disposed between the spatial light modulator 101 and the second grating 102.

Alternatively, both the first grating 102 and the second grating 102 are disposed between the spatial light modulator 101 and the optical waveguide 103.

Alternatively, the optical waveguide 103 is disposed between the spatial light modulator 101 and the first grating 102, and the second grating 102 is disposed between the spatial light modulator 101 and the optical waveguide 103.

Alternatively, the optical waveguide 103 is disposed between the spatial light modulator 101 and the second grating 102, and the first grating 102 is disposed between the spatial light modulator 101 and the optical waveguide 103.

When the optical waveguide 103 is disposed between the light modulator 101 and the grating 102, the grating 102 has a function of reflecting a light ray. When the grating 102 is disposed between the light modulator 101 and the optical waveguide 103, the grating 102 enables a light ray to penetrate the grating 102 and plays a function of deflecting a propagation direction of the light ray.

The optical waveguide 103 is a medium that can propagate a light ray, and can propagate a light ray using total reflection of light.

The following describes the information display device in detail with reference to the architectural diagram of the information display device shown in FIG. 1.

The spatial light modulator 101 is configured to emit a holographic three-dimensional light field to the first grating 102.

The spatial light modulator 101 loads holographic display data, generates the holographic three-dimensional light field based on the holographic display data using a light source, and emits the generated holographic three-dimensional light field to the first grating 102. The holographic three-dimensional light field corresponds to at least two focal planes, and the holographic three-dimensional light field emitted into human eyes can display a holographic three-dimensional image using the at least two focal planes.

The holographic display data may be completed in an offline mode, or a conversion module may convert three-dimensional data information into the holographic display data. After the holographic display data is pushed to the spatial light modulator 101, the spatial light modulator 101 is illuminated by a light source such as laser, to generate the holographic three-dimensional light field.

The first grating 102 is configured to deflect the holographic three-dimensional light field emitted by the spatial light modulator, so that the holographic three-dimensional light field is propagated along a first direction and transmitted into the optical waveguide.

The optical waveguide 103 is configured to receive the holographic three-dimensional light field transmitted from the first grating, and propagate the holographic three-dimensional light field in the optical waveguide 103.

The second grating 102 is configured to deflect the holographic three-dimensional light field that is propagated in the optical waveguide 103, so that the holographic three-dimensional light field is emitted out from the optical waveguide 103 along a second direction, and a user sees the holographic three-dimensional image corresponding to the holographic three-dimensional light field after the user's eyes receive the holographic three-dimensional light field that is emitted out along the second direction.

In this way, the holographic three-dimensional light field can be transmitted into the human eyes and the holographic three-dimensional image can be displayed in the human eyes using holographic optical elements such as the spatial light modulator 101, the grating 102, and the optical waveguide 103.

Figure 3:
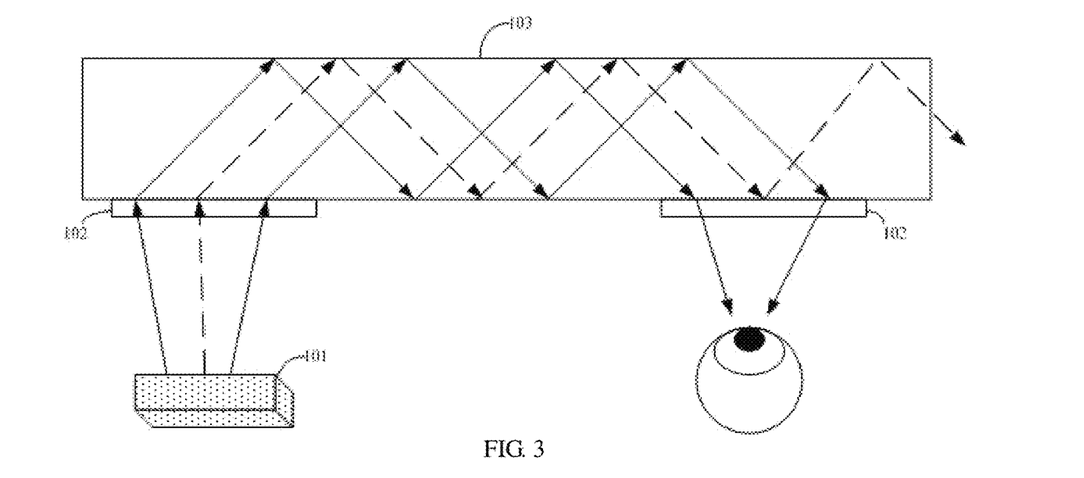
FIG. 3 is a schematic structural diagram 2 of an information display device according to an embodiment of this application.

Referring to FIG. 2, FIG. 3, and the foregoing possible manners of disposing the grating 102, in this embodiment of this application, different manners of disposing the grating 102 correspond to different functions. When the first grating 102 is disposed between the spatial light modulator 101 and the optical waveguide 103, the first grating 102 enables the holographic three-dimensional light field emitted by the spatial light modulator 101 to penetrate the first grating 102, and deflects the holographic three-dimensional light field. Alternatively, the optical waveguide 103 is disposed between the first grating 102 and the spatial light modulator 101, and the first grating 102 reflects the holographic three-dimensional light field emitted by the spatial light modulator 101.

When the second grating 102 is disposed between the spatial light modulator 101 and the optical waveguide 103, the second grating 102 enables the holographic three-dimensional light field propagated in the optical waveguide 103 to penetrate the second grating 102, and deflects the holographic three-dimensional light field. Alternatively, the optical waveguide 103 is disposed between the spatial light modulator 101 and the second grating 102, and the second grating 102 reflects the holographic three-dimensional light field propagated in the optical waveguide 103.

During actual application, the holographic three-dimensional light field includes collimated zero-order light and broadband three-dimensional object light. The three-dimensional object light is propagated by the optical waveguide 103 and deflected by the grating 102, and then reaches the human eyes to participate in imaging, to generate the holographic three-dimensional image. The zero-order light does not participate in imaging. If the zero-order light is transmitted into the human eyes, the zero-order light is displayed as white light dots on the holographic three-dimensional image, and consequently, contrast and brightness of the holographic three-dimensional image are reduced, and a presentation effect of the holographic three-dimensional image is affected. In this embodiment of this application, the zero-order light is filtered out to cancel interference of the zero-order light to a final presentation effect.

Figure 4:
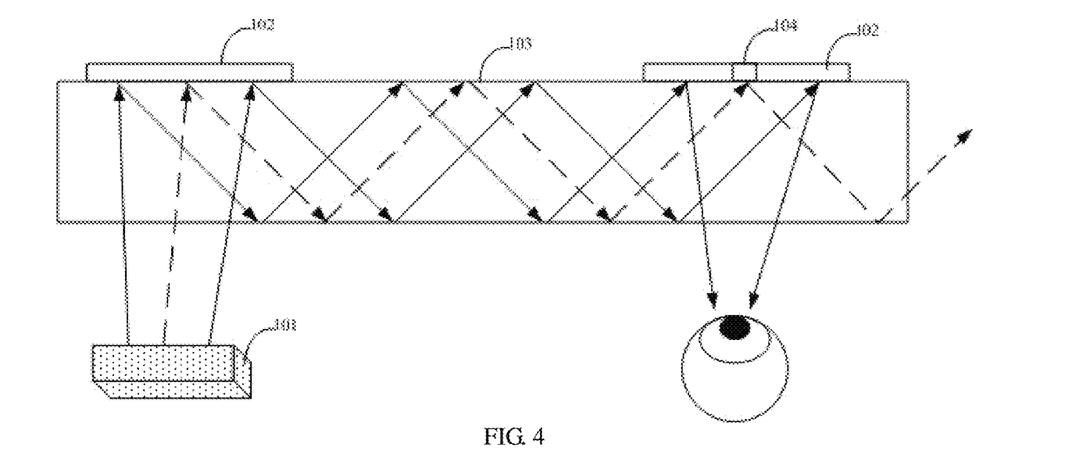
FIG. 4 is a schematic structural diagram 3 of an information display device according to an embodiment of this application.

The architecture basis shown in FIG. 2 is used as an example, as shown in FIG. 4, the information display device further includes a separation hole 104, and the first grating 102 further has a lens function. The first grating 102 may be a coupling grating that integrates the lens function. For example, the first grating 102 is a holographic film, and the holographic film has a function of a thin lens. The thin lens may be a Fresnel lens, and can play a function of converging light rays, so that the light rays are converged on a rear focal plane. The first grating 102 may alternatively be a combination of a coupling grating and a lens grating. The coupling grating plays a function of deflecting a light ray, and the lens grating plays a function of converging light rays. The separation hole 104 is arranged in the second grating 102. The separation hole 104 may be in a grating-free area of the second grating 102, so that a light ray emitted to this area can be deflected along another direction that deviates from an original direction of grating reflection, and optionally, the light ray continues to be propagated in the optical waveguide 103 until the light ray is emitted out on a side of the optical waveguide 103. Alternatively, the separation hole 104 may be a high-absorption film, which plays a function of highly absorbing a light ray and can absorb all or most of light rays emitted to this area.

Solid lines in FIG. 4 represent three-dimensional object lights. A three-dimensional object light emitted from the spatial light modulator 101 is propagated to the optical waveguide 103. After being reflected by the first grating 102, the three-dimensional object light is propagated along the first direction and transmitted into the optical waveguide 103, and is totally reflected in the optical waveguide 103, so that the three-dimensional object light is propagated in the optical waveguide 103, until the three-dimensional object light is reflected by the second grating 102. The three-dimensional object light is propagated along the second direction and emitted out from the optical waveguide 103, and is transmitted into the human eyes, so that the user sees the holographic three-dimensional image corresponding to the holographic three-dimensional light field after the user's eyes receive the holographic three-dimensional light field that is emitted out along the second direction. For a real-scene light field, the second grating 102 is basically transparent. Therefore, the human eyes can simultaneously receive a real-scene image and a holographic three-dimensional image, thereby generating an augmented reality effect with a true three-dimensional display function.

Light rays indicated by dashed lines represent light rays of the zero-order light. The light rays of the zero-order light pass through the first grating 102, and are converged by the first grating 102. The separation hole 104 is arranged on a rear focal plane of the first grating 102, so that the light rays of the zero-order light are focused at the separation hole 104 by the first grating 102. The separation hole 104 absorbs the focused zero-order light, or propagates the focused zero-order light along a third direction. The third direction is different from the second direction. In this way, the zero-order light is not deflected by the second grating 102 and not transmitted into the human eyes.

Figure 5:
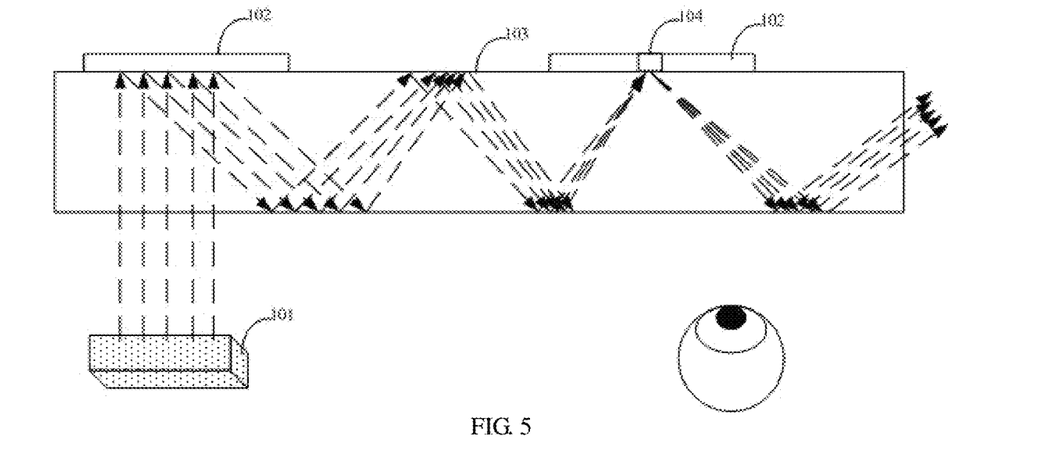
FIG. 5 is a schematic diagram of a zero-order light filtering principle of an information display device according to an embodiment of this application.

To better illustrate a process of filtering out the zero-order light, the following is shown in FIG. 5: A beam of light rays of zero-order light are reflected and deflected after passing through the first grating 102. After being totally reflected a plurality of times in the optical waveguide 103, the light rays are focused at a focal plane by the separation hole 104, in other words, focused at the separation hole 104 in the second grating 102. All or most of the focused zero-order light is absorbed by the separation hole 104, or the focused zero-order light is defected by the separation hole 104 along another direction that deviates from an original reflection direction.

The three-dimensional object light is illuminated to a grating-existent area of the second grating 102 and is deflected into the human eyes, but the zero-order light is focused at the separation hole 104 in the second grating 102 and is not deflected into the human eyes. Therefore, the zero-order light is separated from the three-dimensional object light, thereby eliminating zero-order noise.

Figure 6:
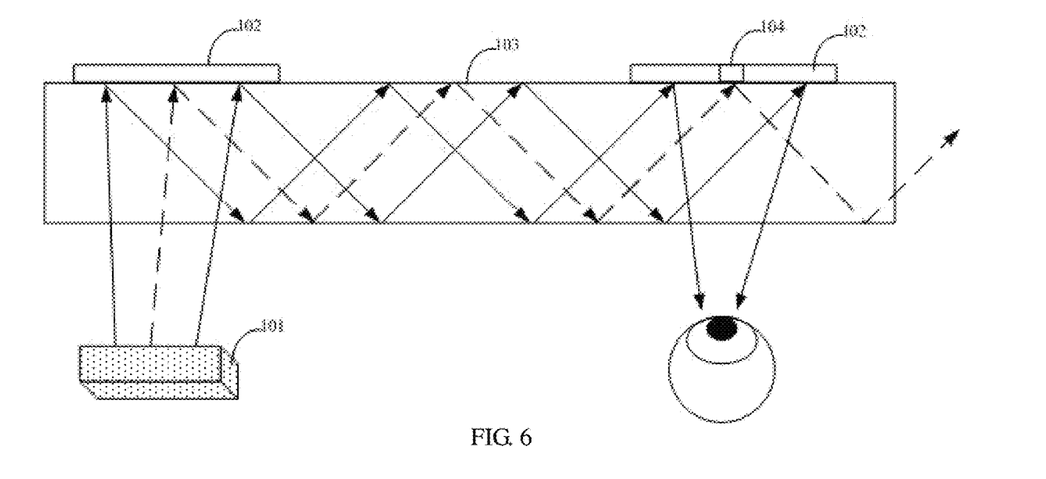
FIG. 6 is a schematic diagram of magnifying a display field of view of an information display device according to an embodiment of this application.

To magnify a display field of view (FoV), as shown in FIG. 6, the second grating 102 also has a lens function. A method for integrating the lens function into the second grating 102 is the same as the method for integrating a lens into the first grating 102, and details are not described herein again. The second grating 102 has a function of magnifying presentation of an object that is located within a 1× focal length of the second grating 102. When a holographic three-dimensional image 105 is located within the 1× focal length of the second grating 102, the second grating 102 magnifies the holographic three-dimensional image 105 for display.

The first grating 102 and the second grating 102 integrate the lens function. This can not only eliminate zero-order noise but also magnify a FoV of true three-dimensional display without obviously increasing a device volume.

Figure 7:
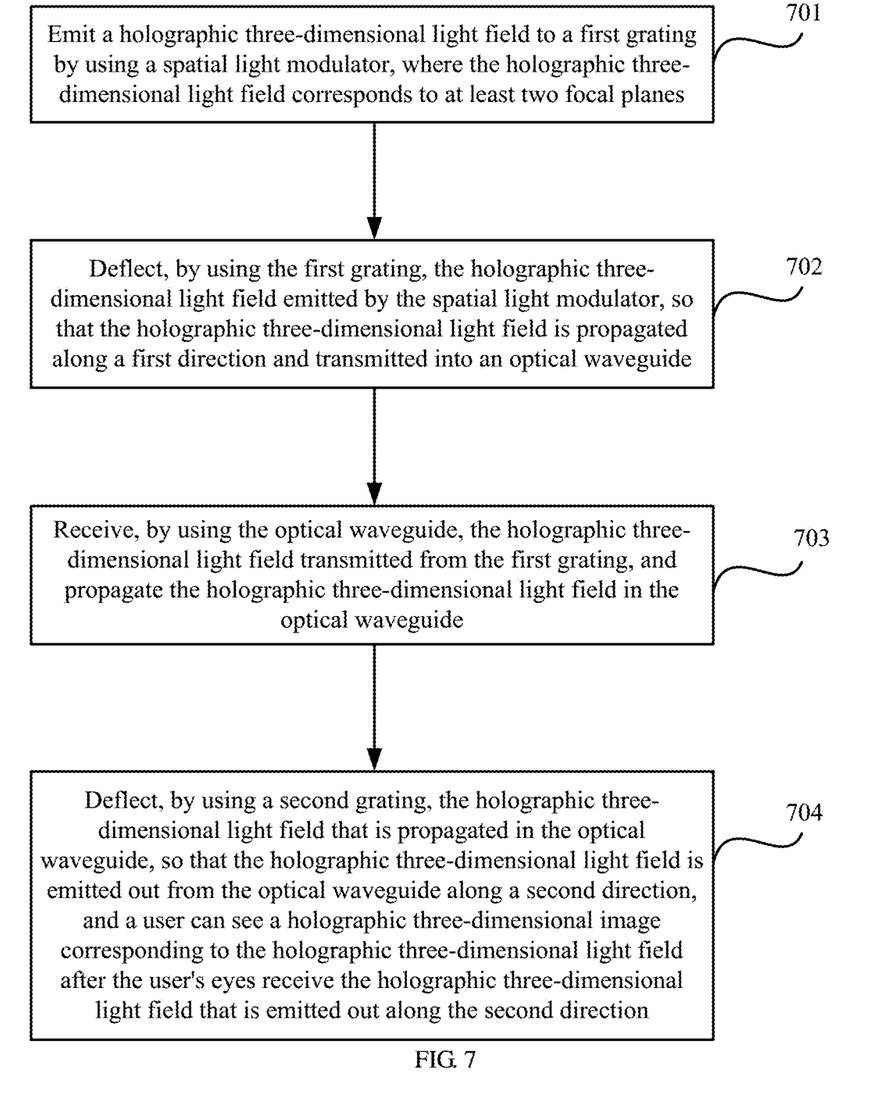
FIG. 7 is a schematic flowchart of an information display method according to an embodiment of this application.

Based on a same idea, as shown in FIG. 7, an embodiment of this application further provides an information display method, where the method is applied to the information display device 100. The method is as follows.

Step 701: Emit a holographic three-dimensional light field to a first grating using a spatial light modulator, where the holographic three-dimensional light field corresponds to at least two focal planes.

Step 702: Deflect, using the first grating, the holographic three-dimensional light field emitted by the spatial light modulator, so that the holographic three-dimensional light field is propagated along a first direction and transmitted into an optical waveguide.

Step 703: Receive, using the optical waveguide, the holographic three-dimensional light field transmitted from the first grating, and propagate the holographic three-dimensional light field in the optical waveguide.

Step 704: Deflect, using a second grating, the holographic three-dimensional light field that is propagated in the optical waveguide, so that the holographic three-dimensional light field is emitted out from the optical waveguide along a second direction, and a user sees a holographic three-dimensional image corresponding to the holographic three-dimensional light field after the user's eyes receive the holographic three-dimensional light field that is emitted out along the second direction.

Optionally, zero-order light in the holographic three-dimensional light field is focused at a separation hole using the first grating, where the separation hole is disposed in the second grating, and the focused zero-order light is absorbed using the separation hole, or the focused zero-order light is propagated using the separation hole along a third direction, where the third direction is different from the second direction.

Optionally, when the holographic three-dimensional image is located within a 1× focal length of the second grating, the holographic three-dimensional image is magnified for display using the second grating, where the second grating has a lens function.

Optionally, if the first grating is disposed between the spatial light modulator and the optical waveguide, the first grating enables the holographic three-dimensional light field to penetrate the first grating, and deflects the holographic three-dimensional light field, if the optical waveguide is disposed between the first grating and the spatial light modulator, the holographic three-dimensional light field emitted by the spatial light modulator is reflected using the first grating, if the second grating is disposed between the spatial light modulator and the optical waveguide, the second grating enables the holographic three-dimensional light field to penetrate the second grating, and deflects the holographic three-dimensional light field, or if the optical waveguide is disposed between the spatial light modulator and the second grating, the holographic three-dimensional light field is reflected using the second grating.

Although some embodiments of this application have been described, persons skilled in the art can make changes and modifications to these embodiments. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of the present disclosure. This application is intended to cover these modifications and variations provided that they fall within the scope of protection defined by the following claims and their equivalent technologies.

What is claimed is:

1. An information display device, comprising:
a first grating;
an optical waveguide;
a spatial light modulator configured to emit a holographic three-dimensional light field toward the first grating, wherein the holographic three-dimensional light field corresponds to at least two focal planes, and wherein the first grating is configured to deflect the holographic three-dimensional light field into the optical waveguide, wherein the optical waveguide is configured to propagate the transmitted holographic three-dimensional light field;
a second grating comprising a separation hole and configured to deflect three-dimensional object light into the holographic three-dimensional light field that is propagated by the optical waveguide, wherein the optical waveguide is configured to emit out the three-dimensional object light, wherein the first grating is further configured to focus, at the separation hole, zero-order light in the holographic three-dimensional light field that comes from the spatial light modulator, and wherein the separation hole is configured to absorb the zero-order light after focusing the zero-order light in the holographic three-dimensional light field.

2. The information display device according to claim 1, wherein the second grating is further configured to magnify the holographic three-dimensional image for display when the holographic three-dimensional image is located within a 1× focal length of the second grating.

3. The information display device according to claim 1, wherein the first grating is disposed between the spatial light modulator and the optical waveguide, and wherein the first grating is configured to deflect the holographic three-dimensional light field when the holographic three-dimensional light field penetrates the first grating.

4. The information display device according to claim 1, wherein the optical waveguide is disposed between the first grating and the spatial light modulator, and wherein the first grating is configured to reflect the holographic three-dimensional light field.

5. The information display device according to claim 1, wherein the second grating is disposed between the spatial light modulator and the optical waveguide, wherein and wherein the second grating is configured to deflect the holographic three-dimensional light field when the holographic three-dimensional light field penetrates the second grating.

6. The information display device according to claim 1, wherein the optical waveguide is disposed between the spatial light modulator and the second grating, and wherein the second grating is configured to reflect the holographic three-dimensional light field.

7. An information display method, comprising:
emitting a holographic three-dimensional light field to a first grating using a spatial light modulator, wherein the holographic three-dimensional light field corresponds to at least two focal planes;
deflecting, using the first grating, the holographic three-dimensional light field into an optical waveguide;
propagating, using the optical waveguide, the holographic three-dimensional light field; and
deflecting, using a second grating, three-dimensional object light into the holographic three-dimensional light field that is propagated by the optical waveguide;
emitting, by the optical waveguide, out the three-dimensional object light
focusing, at a separation hole of the second grating, using the first grating, zero-order light in the holographic three-dimensional light field from the spatial light modulator; and
absorbing the zero-order light using the separation hole or propagating, using the separation hole, the zero-order light in the optical waveguide in a total reflection manner after focusing the zero-order light in the holographic three-dimensional light field.

8. The method according to claim 7, wherein the holographic three-dimensional image is located within a 1× focal length of the second grating, further comprising magnifying, by the second grating, the holographic three-dimensional image for display.

9. The method according to claim 7, wherein the first grating is disposed between the spatial light modulator and the optical waveguide, and wherein the method further comprises:
enabling, by the first grating, the holographic three-dimensional light field to penetrate the first grating; and
deflecting the holographic three-dimensional light field.

10. The method according to claim 7, wherein the optical waveguide is disposed between the first grating and the spatial light modulator, and wherein the method further comprises reflecting, using the first grating, the holographic three-dimensional light field emitted by the spatial light modulator.

11. The method according to claim 7, wherein the second grating is disposed between the spatial light modulator and the optical waveguide, and wherein the method further comprises:
enabling, by the second grating, the holographic three-dimensional light field to penetrate the second grating; and
deflecting the holographic three-dimensional light field.

12. The method according to claim 7, wherein the optical waveguide is disposed between the spatial light modulator and the second grating, and wherein the method further comprises reflecting, using the second grating, the holographic three-dimensional light field.

13. An information display device, comprising:
a first grating;
an optical waveguide;
a spatial light modulator configured to emit a holographic three-dimensional light field towards the first grating, wherein the holographic three-dimensional light field corresponds to at least two focal planes, and wherein the first grating is configured to deflect the holographic three-dimensional light field into the optical waveguide, wherein the optical waveguide is configured to propagate the transmitted holographic three-dimensional light field;
a second grating comprising a separation hole and configured to deflect three-dimensional object light into the holographic three-dimensional light field that is propagated by the optical waveguide, wherein the optical waveguide is configured to emit out the three-dimensional object light, wherein the first grating is further configured to focus, at the separation hole, zero-order light in the holographic three-dimensional light field that comes from the spatial light modulator, and wherein the separation hole is configured to propagate the zero-order light in the optical waveguide in a total reflection manner after focusing the zero-order light in the holographic three-dimensional light field.

14. The information display device according to claim 13, wherein the second grating is further configured to magnify the holographic three-dimensional image for display when the holographic three-dimensional image is located within a 1× focal length of the second grating.

15. The information display device according to claim 13, wherein the first grating is disposed between the spatial light modulator and the optical waveguide, and wherein the first grating is configured to deflect the holographic three-dimensional light field when the holographic three-dimensional light field penetrates the first grating.

16. The information display device according to claim 13, wherein the optical waveguide is disposed between the first grating and the spatial light modulator, and wherein the first grating is configured to reflect the holographic three-dimensional light field.

17. The information display device according to claim 13, wherein the second grating is disposed between the spatial light modulator and the optical waveguide, and wherein the second grating is configured to deflect the holographic three-dimensional light field when the holographic three-dimensional light field penetrates the second grating.

18. The information display device according to claim 13, wherein the optical waveguide is disposed between the spatial light modulator and the second grating, and wherein the second grating is configured to reflect the holographic three-dimensional light field.

19. The information display device according to claim 13, wherein the second grating is disposed between the spatial light modulator and the optical waveguide.

20. The information display device according to claim 13, wherein the optical waveguide is disposed between the spatial light modulator and the second grating.

* * * * *